United States Patent [19]

Olsen

[11] Patent Number: 4,946,077
[45] Date of Patent: Aug. 7, 1990

[54] IN-LINE AIR-BLEED VALVE FOR HAND-OPERATED GREASE GUNS

[76] Inventor: LaVerne R. Olsen, Route 2, Osage, Iowa 50461

[21] Appl. No.: 332,056

[22] Filed: Apr. 3, 1989

Related U.S. Application Data

[63] Continuation-in-part of Ser. No. 167,292, Mar. 11, 1988, abandoned.

[51] Int. Cl.$^5$ .............................................. G01F 11/00
[52] U.S. Cl. ...................... 222/256; 222/397; 251/145; 184/105.2
[58] Field of Search ............... 222/251, 331, 256, 481, 222/551, 549, 397; 184/105.2; 251/145; 417/435, 440

[56] References Cited

U.S. PATENT DOCUMENTS

| | | | |
|---|---|---|---|
| 1,227,430 | 5/1917 | Gries | 222/551 |
| 1,231,996 | 7/1917 | Bowers | 222/551 |
| 1,424,243 | 8/1922 | Fox | 222/551 |
| 1,686,309 | 10/1928 | Zabriskie . | |
| 1,721,817 | 7/1929 | Goodman . | |
| 1,769,982 | 7/1930 | Albertine . | |
| 1,969,822 | 8/1934 | Schroeder . | |
| 2,729,361 | 1/1956 | Ephron . | |
| 3,160,105 | 12/1964 | Sherman et al. . | |
| 3,258,030 | 6/1966 | Clark, Jr. . | |
| 3,774,813 | 11/1973 | Vanderveen . | |
| 3,788,427 | 1/1974 | Fox et al. . | |
| 4,063,618 | 12/1977 | O'Dell . | |
| 4,168,787 | 9/1979 | Stamper . | |
| 4,219,131 | 8/1980 | Funderburgh . | |

OTHER PUBLICATIONS

Wallaces Farmer, Advertising, vol. 113, No. 13, Sep. 13, 1988.

Primary Examiner—H. Grant Skaggs
Attorney, Agent, or Firm—Simmons, Perrine, Albright & Ellwood

[57] ABSTRACT

An attachment for bleeding trapped air from hand-operated grease guns consists of an in-line valve for disposition between the gun and its output tube. The valve features an in-line fitting on which is threaded a hand-operated nut. When the nut is backed-off it opens a port in the fitting through which trapped air can be bled off.

8 Claims, 1 Drawing Sheet

IN-LINE AIR-BLEED VALVE FOR HAND-OPERATED GREASE GUNS

This is a continuation-in-part of application Ser. No. 07/167,292, filed March 11, 1988, now abandoned.

BACKGROUND OF THE INVENTION

A typical hand-operated grease gun includes a cylindrical reservoir from which grease is exuded into a hand-operated, piston-type pump disposed in a housing closing one end of the reservoir. The grease is expelled from the pump under pressure through an outlet in the gun end housing into and through a removable output tube, which tube may be rigid or flexible and of varying length with an appropriate nozzle at its outer end. Unfortunately, grease guns of this type are beset with the problem of air pockets. Air may be trapped between the grease and the pump when the gun is initially filled, or poCkets of air may be trapped within the grease itself. This is true even when the grease is supplied in paperboard cylinders for insertion into the gun, as well as when it is simply filled from a remote source of bulk grease. Once the trapped air gets into the pump it renders the pump useless insofar as its ability to expel grease from the nozzle is concerned. That condition continues until the air is finally exhausted from the nozzle by repeated strokes of the pump which by repeated compressions of the air gradually moves the latter through the output tube.

All users of these guns are well aware of this problem and the angry frustration it generates. One is lubricating, say, a piece of machinery, stroking the pump's operating lever, when suddenly the lever goes "limp", signaling that an air pocket has reached the pump. The job is thus interrupted until the air can be expelled. The longer the output tube, in order to reach otherwise inaccessible lubrication points, for instance, the greater the time it takes to expel the air and the greater the frustration it engenders. Such longer output tubes, or extensions, are often used to lubricate construction equipment and farm machinery, frequently under less than ideal conditions and often when downtime for service is at a premium. It is believed that in such extensions the air expands and contracts similarly to air in a cylinder of an air-type spring, maintaining sufficient back pressure seepage to make it most difficult for the pump to regain its primed condition.

The prior art has recognized the above problem in the form of a valve assembly to be mounted between the pump assembly of the grease gun and the dispensing extension. The valve assembly is in essence a bleeder-type push valve which communicates via a "T"-fitting with the outlet duct of the pump leading into the dispensing extension. The prior art valve features a stem disposed in the vertical leg of the "T"-fitting, the stem normally being biased outwardly from the outlet duct with its lower portion against a seat into a closed position. The lower portion of the stem features a sealing ring, such that when pressure is built up in the outlet duct, the valve remains normally sealed shut to air and grease. The angular disposition of the valve stem with respect to the pump and handle assembly of the grease gun depends, of course, on tolerances and thread positions on both the fittings on the grease gun and the "T"-fitting housing the valve. As a result in general, the valves will not be oriented in definite, readily accessible positions with respect to the handles of grease guns, when the "T"-fittings are securely seated at the outlet duct of the grease gun.

In view of the known prior art, a need still exists for a simple but effective and readily accessible attachment for grease guns, particularly hand-operated grease guns, to allow trapped air pockets to be removed from a point immediately downstream of the pump. It is, consequently, an object of the invention to provide such an attachment, and particularly one which is accessible regardless of the degree to which threads need to be engaged for proper seating and which shows such other advantages as will become apparent from the specification.

SUMMARY OF THE INVENTION

The aim of the invention is achieved by an air-bleed valve placed in-line between the grease outlet in the gun's end housing and the output tube. One major part of the valve is a simple in-line fitting bored through from end to end, one end portion being coupled to the pump outlet, the other end portion being coupled to the end of the output tube. The other major part of the valve is a hand-operated nut on an externally threaded portion of the fitting which can be turned up to sealingly abut a shoulder formed between the two portions of the fitting. In that position the nut encompasses and thus closes an air bleed port closely adjacent the shoulder and opening into the bore through the fitting. When an air pocket is encountered in the gun, the nut is simply backed off to uncover the port and allow the trapped air to be expelled by the pump. Since the port is just downstream from the pump, the air need not pass the full length of the output tube before being released so time and tempers are saved, especially when long output tubes are in use. Since the valve is a separate attachment, it can be fitted to grease guns initially, both of the lever-type as well as the pistol-type, or supplied as an after-market item for guns already in the field. The latter is an important feature inasmuch as no modifications are necessary to the gun itself. Other features and advantages of the invention will become apparent from the drawings and the more detailed description which follows.

DETAILED DESCRIPTION OF THE PREFERRED EMBODIMENT

Figure 1:
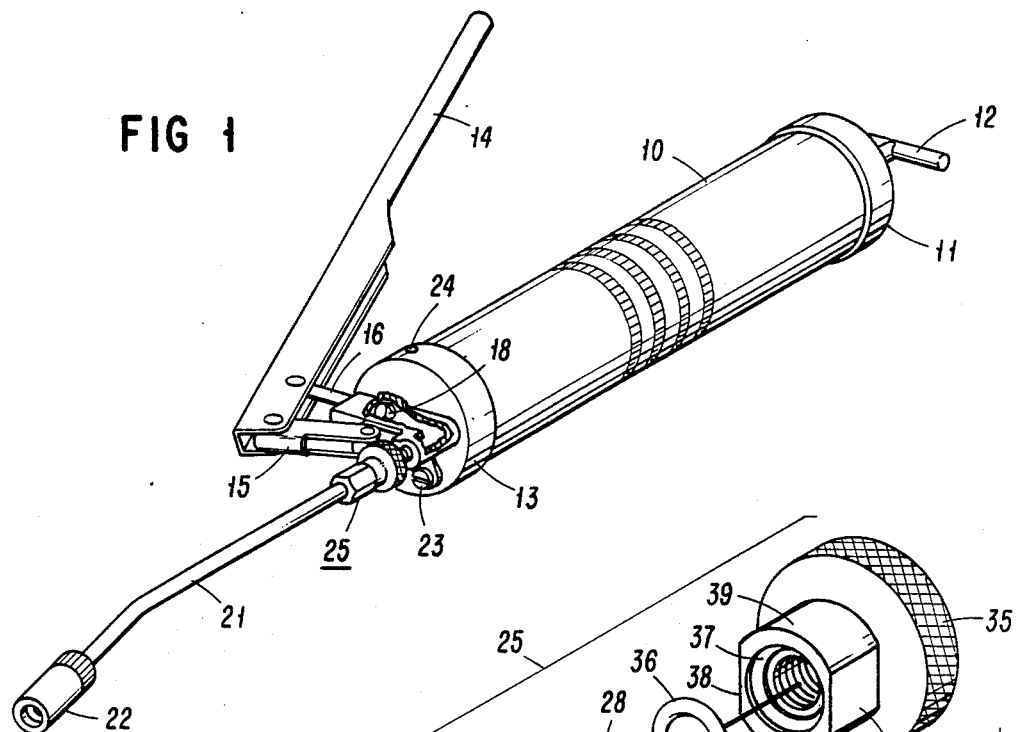
FIG. 1 illustrates a typical hand-operated grease gun with the air-bleed valve of the invention installed.
Figure 2:
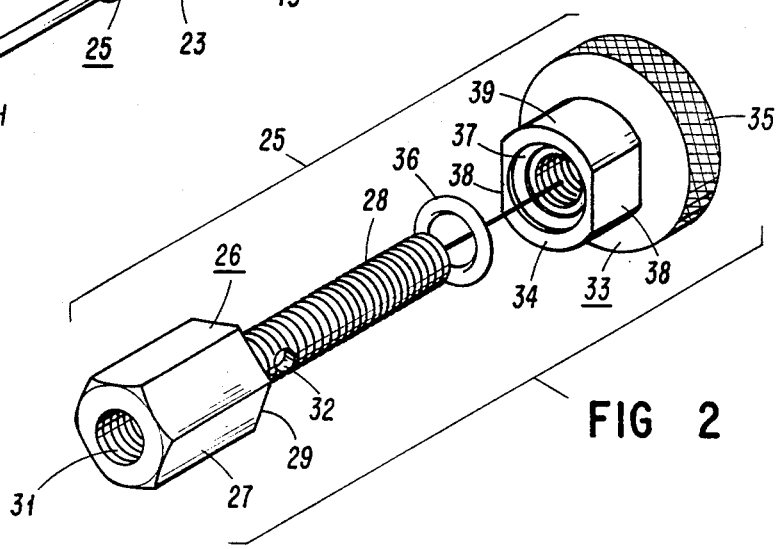
FIG. 2 is an exploded view of the air-bleed valve itself.

The lever-type, hand-operated grease gun of FIG. 1 includes a cylindrical grease reservoir 10 closed at one end by a threaded cap 11 through which a spring-loaded plunger 12 operates. A housing 13 is threaded on the other end of the reservoir 10 and incorporates a pump hand lever 14 connected to a link 15 and to the outer end of a piston 16. Stroking the hand lever 14 reciprocates the piston 16 in a pump chamber 17 (see FIG. 3) having an inlet 18 (see FIG. 1) communicating with the reservoir 10. The pump chamber 17 communicates in turn with the exterior of the gun through an internally threaded outlet bore 19 in a nose 20 on the end housing 13. Normally an outlet tube 21, which may be rigid (as shown) or flexible, is threaded at its rearward end into the gun outlet 19 and fitted at its forward end with an appropriate grease nozzle 22.

The gun is loaded with grease, after withdrawing the plunger 12, either by removing the end cap 11 and inserting a grease cartridge or by removing a plug 23 in the end housing 13 and filling from a source of bulk grease. An air-bleed port 24 is customarily provided in the end housing 13 and normally closed by the adjacent end of the reservoir 10. The port 24 will allow some air trapped between the grease and the end housing 13 to be released by unscrewing the latter a few turns to open the port 24 after releasing the plunger 12. But since the port 24 is upstream of the pump chamber 17 it cannot release air then or later trapped in the pump chamber 17. That can only be done at a point downstream of the pump chamber 17. At any rate the plunger 12 forces grease from the reservoir 10 into the pump chamber 17 through the inlet 18 during strokes of the hand lever 14, the piston 16 then forcing the grease under pressure through the outlet 19 and tube 21. A check valve (not shown) downstream of the pump chamber 17 prevents reverse flow of the grease.

The air-bleed valve of the invention, generally designated at 25, consists as previously noted of two major parts, an in-line fitting 26 and a hand-turnable nut 33. The fitting 26 has essentially a cylindrical shape and is provided with a hexagonal head 27 for rotation by an open-end wrench and with a concentric shank 28. The hexagonal head 27 is larger in its diametrical dimension than the shank 28, a step at the interface between the head 27 and the shank 28 forming a shoulder 29 with the head 27. The fitting 26 is axially bored through at 30, the bore 30 at the outer end of the head 27 having an internally threaded counterbore at 31 to receive the rear end of the grease tube 21. The shank 28 is externally threaded to screw into the gun outlet 19, the threads of the shank 28 extending to closely adjacent the shoulder 29. Adjacent the latter an air-bleed port 32 extending radially through the wall of the shank 28 opens into the bore 30. The nut 33 is threaded on the exposed threads of the shank 28 and provided with an annular end face or shoulder 34 to sealingly move toward the shoulder 29 of the head 27 such that the port 32 becomes covered by the nut 33 when the nut 33 is rotated in such direction toward the shoulder 29.

The length of the shank 28 and its threads are chosen so that rotation of the nut 33 in the opposite direction uncovers the port 32, the perimeter of the nut 33 is ideally sculptured to be slip-resistant when manually rotated, being preferably knurled at 35 for better grip between thumb and fingers. Other slip-resistant surface features are possible, such as deep cuts in the perimeter of the nut 33. In prototypes of the valve 25 the fitting 26 has been made of steel and the respective nut 33 of brass, both having been manufactured on automatic screw machines in well-known fashion. The machining process is sufficiently accurate that the machined shoulders 29 and 34 provided an effective seal to retain grease under pressure when the nut 33 became screwed tightly against the shoulder 29.

However, it has been found convenient and not inconsistent with the scope and spirit hereof to manufacture production quantities of the air-bleed valve of a cast metal alloy, sometimes referred to as white metal, which is a commercially available material for many small machine castings. An advantage of the casting process is that the amount of machining becomes limited to threading the shank 28 and the internal thread 31 of the fitting 26, and the nut 33. A disadvantage lies in the inaccuracies of typical casting processes.

Some cast parts tend to exhibit a seepage of grease through otherwise unnoticeably small gaps between the shoulders 29 and 34, even though the shoulders 34 of the nuts 33 are tightened snugly against their mating shoulders 29 on the respective fittings 26. A sealing ring 36 of a resilient material is, consequently, added between the shoulders 29 and 34 (see FIG. 3). The sealing ring 36 eliminates the seepage. The material selected for the sealing ring 36 is preferably a grease and oil resistant resilient material, as can be selected from commercially available "O"-ring catalogues.

Figure 3:
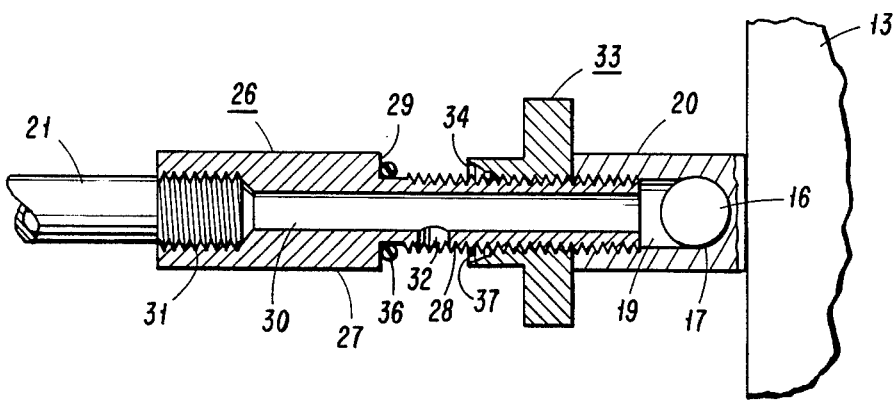
FIG. 3 is an axially sectioned view of the air-bleed valve as installed on the grease gun of FIG. 1.

However, it should be noted that the pressure of the grease in the bore 30 is of sufficient magnitude to exhibit a tendency to "blow" the ring 36 out from between the shoulders 29 and 34 when the piston 16 is operated. To eliminate that problem, an inner annular portion of the shoulder 34 is consequently formed into a cupped recess 37 of a depth which is marginally less than the selected thickness of the ring 36. Thus, with the sealing ring 36 in place as shown in FIG. 3, tightening the nut 33 snugly toward the opposing shoulder 29 moves the shoulder 34 to within approximately twenty percent (20%) of the thickness of the sealing ring 36. This distance is merely an estimate, in that the amount of tightening the nut 33 affects the distance between the shoulders 29 and 34, and a hard tightening of the nut 33 essentially brings the shoulders 29 and 34 into contact with each other, such that the sealing ring 36 becomes totally embedded within the recess 37. Opposing flats 38 on the nut 33 permit an open end wrench to be used for such complete tightening of the nut 33 against the shoulder 29. Such forced tightening of the nut 33 may be desirable for a field repair when the sealing ring 36 is for some reason damaged and a replacement is not available.

The above-described problem of grease seepage, also led to the discovery of a phenomenon which is believed to have an unforeseen beneficial effect on the operation of the air-bleed valve 25. The escape of grease from between the shoulders 29 and 34, when they were improperly seated, caused an experiment to be conducted. With one of the prototype machined air-bleed valves mounted as described herein, air was intentionally induced into the pump chamber 17 and the outlet bore 19. The nut 33 was at that time turned to lock the shoulders 29 and 34 tightly against each other. The entire assembly was then submersed in water at room temperature and the hand lever 14 was stroked to reciprocate the piston 16 in an attempt to build pressure.

When the airlock was at least partially overcome and pressure started to build in the bore 30 bubbles were noticed escaping from between the nut 33 and the shank 28. At first, only few bubbles were noticed but then more bubbles escaped as the pressure increased because of the continued pumping action and the closed-off nozzle 22 as described. No air escaped from between the shoulders 29 and 34.

A possible advantage of the described structure is suggested, in that a high pressure in the bore 30 may result in a continuous, yet small air purging action through the helical path of the threaded portions of the shank 28 in engagement with the internally threaded portion of the nut 33 while the grease gun is in use, thus tending to reduce the amount of air that is pushed through the outlet tube 21 toward the nozzle 22 under normal operating conditions. Such escape of air may be attributed to the lower viscosity of air in comparison to the grease in the passage and the presence of the high pressure drop over the distance through which the air must travel. In order to escape, the air needs to push an opening through space between engaging threads and any accumulated amounts of grease therebetween.

Any such reduction of air in the grease is believed to transmit a more solid pumping force to the front of the nozzle 22 when such force is needed to break through typical dried grease deposits of machinery joints (not shown) in need of lubrication. The above-described discovery does not, however, obviate the need to release a substantial air pocket through the port 32 as herein described to prevent an airlock from frustrating work efforts.

The air-bleed valve 25 is applied to a gun in the field simply by first removing the outlet tube 21, screwing the valve shank 28 into the gun outlet 19, and then the outlet tube back into the head 27. The sealing ring 36 and the nut 33 should, of course, be assembled on the shank 28 before the valve shank 28 is screwed into the gun outlet 19. During operation of the gun the nut 33, of course, is turned up against the fitting shoulder 29 to close the port 32. When feel of the hand lever 14 indicates air is trapped in the pump chamber 17, the nut 33 is backed off to open the port 32 and the lever 14 stroked until the air is exhausted through the port 32, after which the latter is again closed by the nut 33. The knurled perimeter 35 in conjunction with the axial in-line structure of the valve 25 has the advantage that tightening the fitting 26 does not move the valve 25 to a less than ideal angular position in which access to the knurled perimeter becomes restricted, as for example by the position of the link 15. The diametric size of the nut 33 is chosen to facilitate simple operation by a grease gun operator In most instances the nut 33 is accessible and air can be released while the nozzle 22 is coupled to a standard grease nipple, not shown. Such in-place release of an air-lock is of particular advantage to a lubrication operation when a particular lubrication point is hard to reach, as in some more complex equipment.

As is to be understood, changes and modifications from the described preferred embodiment are possible without departing from the spirit and scope of this invention. For example, materials and processes for making the shank 28 and nut 33 can be varied without departing from the spirit and scope of this invention. Thus it may be contemplated to mold the nut 33 of any one of a number of suitable and readily available plastics, such as nylon. Also, the shape of the nut could be changed, for example to eliminate the flats 38 and the portion 39 of reduced diameter to increase the width of the knurled perimeter 35 over the entire thickness of the nut 33. These and other modifications are possible within the spirit and scope of this invention which is defined by the scope of the appended claims.

I claim:

1. In a hand-operable grease gun having a cylindrical reservoir for grease with a closure at each end, the closure at one end constituting an end housing incorporating a hand-operated grease pump having a pump chamber communicating with the interior of the grease reservoir, and an internally threaded grease outlet from the pump chamber integral with the end housing and opening therefrom, the pump being effective to supply grease from the grease reservoir under pressure to the grease outlet, and an elongated tubular member for conveyance of grease under pressure from the grease outlet, the tubular member being externally threaded at one end for threaded connection into the grease outlet, the combination therewith of an in-line, air-bleed valve disposed between the grease gun outlet and the tubular member and selectively operable to bleed off air trapped within the pump chamber, the air-bleed valve comprising: an integral fitting having opposite first and second ends and an internal bore extending axially through said fitting between said ends for passage of grease from said grease outlet to said tubular member, the fitting including a first portion having an internally threaded counterbore into said internal bore from the first fitting end threadedly receiving said threaded end of the tubular member and a reduced second portion concentric with said internal bore and forming a shoulder with the first portion intermediate said fitting ends, the fitting second portion being externally threaded in the axial direction of the fitting from the second fitting end to adjacent said shoulder and threadedly connected at said second fitting end into the grease gun outlet, the axial extent of the threads along the fitting second portion providing a length of exposed threads on the fitting second portion between said shoulder and the grease gun outlet, an air-bleed port extending from said internal bore and opening through the fitting second portion closely adjacent said shoulder; and a hand-turnable nut internally threaded on said exposed threads, the axial length of said exposed threads allowing the nut to be rotated on said exposed threads to move the nut in one axial direction of said fitting to encompass said port and to move the nut in the opposite axial direction to expose said port, the nut having an end face providing engagement with said shoulder when the nut encompasses said port.

2. The combination of claim 1 further comprising a sealing ring disposed concentrically to and on said second portion adjacent such shoulder, said nut including an annular recess in said end face, adjacent such threads and of a depth less than the thickness of said sealing ring, such that the recess engages and retains at least a portion of said sealing ring, said sealing ring providing a grease sealing closure between said shoulder of said fitting and said end face of said nut.

3. The combination of claim 1 wherein the fitting first portion is polygonal in cross-section for rotation by an open-end wrench.

4. The combination of claim 3 wherein an outer periphery of the nut is provided with thumb and finger gripping means.

5. An in-line, air-bleed valve for use with a hand-operable grease gun having a grease outlet and an elongated tubular member normally releasably connected at one end to the grease outlet for conveyance of grease under pressure from the grease outlet, the valve being optionally attachable between said outlet and said tubular member and comprising: an integral fitting having opposite first and second ends and an internal bore extending axially through said fitting between said ends for passage of grease from said grease outlet to said tubular member, the fitting including a first portion having means couplingly engaging said end of the tubular member of a grease gun and a reduced second portion concentric with said internal bore and forming a shoulder with the first portion intermediate said fitting ends, the fitting second portion being externally threaded in the axial direction of the fitting from the second fitting end to adjacent said shoulder, said second fitting end adapted to couplingly engage said outlet of a grease gun, the axial extent of the threads along the fitting second portion being sufficient to provide a length of exposed threads on the fitting second portion between said shoulder and said outlet of a grease gun when the fitting second portion is coupled thereto, an air-bleed port extending from said internal bore and opening through the fitting second portion closely adjacent said shoulder; and a hand-turnable nut internally threaded on said exposed threads, the axial length of said exposed threads allowing the nut to be rotated on said exposed threads to move the nut in one axial direction of said fitting to encompass said port and to move the nut in the opposite axial direction to expose said port, the nut having an end face for engagement with said shoulder when the nut encompasses said port.

6. The valve of claim 5 for use with said grease gun, the outlet of said grease gun being internally threaded, and the elongated tubular member being externally threaded at said one end thereof, wherein said means for couplingly engaging said end of the tubular member comprises an internally threaded counterbore into said internal bore from the first fitting end for threadedly receiving said one end of the tubular member, and said fitting second portion being threaded from and including said second fitting end for threaded connection at said second fitting end into said outlet of a grease gun, said valve further comprising a sealing ring disposed concentrically to and on said second portion adjacent such shoulder, said nut including an annular recess in said end face, adjacent such threads and of a depth less than the thickness of such sealing ring, such that the recess engages and retains the sealing ring against a radially outward pressure from grease under pressure such that the sealing ring provides a sealing closure between said shoulder of said fitting and said end face of said nut.

7. The valve of claim 5 wherein the fitting first portion is polygonal in cross-section for rotation by an open-end wrench.

8. The valve of claim 7 wherein an outer periphery of the nut is provided with thumb and finger gripping means.

* * * * *